United States Patent [19]

Wood

[11] Patent Number: 4,758,454
[45] Date of Patent: Jul. 19, 1988

[54] LINING OF PASSAGEWAYS
[75] Inventor: Eric Wood, Wellingborough, United Kingdom
[73] Assignee: Insituform Group Ltd, Isle of Man
[21] Appl. No.: 819,612
[22] Filed: Jan. 17, 1986
[30] Foreign Application Priority Data Jan. 21, 1985 [GB] United Kingdom ............... 8501474

[51] Int. Cl.⁴ ............................................. B32B 27/00
[52] U.S. Cl. ...................................... 428/36; 428/282; 428/284; 428/286; 428/423.1; 428/423.5
[58] Field of Search ................... 428/284, 36, 283; 418/282, 286, 287, 423.5, 423.1

[56] References Cited

U.S. PATENT DOCUMENTS 4,335,802  6/1982  Hirschner .......................... 428/282
4,390,574  6/1983  Wood ................................. 428/36
4,469,729  9/1984  Watanabe et al. ................. 428/36
4,521,465  6/1985  Shröer et al. ..................... 428/290
4,705,717  11/1987 Cain et al. ......................... 428/284

Primary Examiner—James J. Bell
Attorney, Agent, or Firm—Fred Philpitt

[57] ABSTRACT

The present invention provides a material which comprises a laminate of a fibrous layer such as a felt which can be impregnated with curable synthetic resin, and bonded to the felt is a membrane comprises three layers namely an inner layer of a low softening point material bonded to the felt, a barrier layer which represents a barrier to the aggressive components of the resin such as the styrene, and an outer layer bonded to the outside of the fibrous layer to provide for the application of patches and sealing tapes by heat or solvent welding.

13 Claims, 1 Drawing Sheet

LINING OF PASSAGEWAYS

This invention relates to the lining of passageways, and particularly but not exclusively concerns an improvement in a method of lining passageways which has previously been set forth for the light curing of flexible passageway liners. In the said previous method a flexible lining tube comprising a resin absorbent fibrous layer has a membrane or coating to the outside of the fibrous layer. To insert the lining in a pipeline or passageway initially light curing resin in liquid state is charged into the inside of the tubular liner and is spread throughout the fibrous layer so as to thoroughly impregnate same. The impregnated liner is then turned inside out along the passageway using fluid pressure, the membrane serving to isolate the pressurizing source from the resinous soaked fibrous layer, and also serving as an inflation means for keeping the everted liner held to the passageway surface. Appropriate curing lights are used by placing same inside the passageway and the light from the lights initiates and/or effects the cure of the resin. When the resin is cured, the fibrous layer and and impregnating resin form a rigid shell inside the pipeline or passageway, and the membrane remains insitu defining a smooth inner surface to the lining.

It is appreciated that with the described method appropriate light curing resin must be employed, and the membrane must be capable of allowing the curing light to pass therethrough.

In a specific arrangement, the fibrous material comprises a needled felt of acrylic fibres, whilst the light curing resin is a polyester based resin.

In an alternative arrangement, polyester heat curing resin is used and heat is used, for example by using hot water to inflate the lining tube to cure the resin and the lining is coated with a polyurethane film.

With the known arrangements, there arises a disadvantage that the resin, especially the light curing resin, attacks the film, which is a polyurethane film, which typically has been used as the membrane material.

The present invention was devised with a view to providing a different membrane construction so that it would be more resistant to attack by polyester resins especially polyester light curing resins, and was made mainly for flexible lining tubes as described above, but it is appreciated that the invention may have wider application and can be used for the formation of a multiplicity of products which are moulded from resin impregnated fibrous materials. Examples of such other products comprise pipes, boat hulls, bath tubs and shower trays and the like.

In accordance with the invention there is provided a material comprising a fibrous layer suitable for impregnation with synthetic curable resin, and to one side of which is bonded a membrane which comprises three layers in the form of a first layer which is bonded to the fibres of the fibrous layer, a second layer which is a barrier film providing resistance to the aggressive properties of the resin, and an outer protective film to give the laminate strength and to provide a means for repairing the membrane readily in the event that it is punctured or torn.

The bonding layer is preferably a low melting point synthetic plastics material which serves essentially as a means for connecting the barrier layer to the felt.

The barrier layer is a high melting point synthetic plastics material layer which presents high barrier characteristics to the styrene in the resin which is used for impregnating the fibrous layer. Such a barrier layer prevents styrene in the resin from leaching out of the resin and into contact with the outer layer.

The said outer layer is of a type which readily accepts by solvent or heat welding sealing, a tape or a patch or the like, and which is chemically bondable to the barrier layer.

In a specific case, where the fibrous material comprises acrylic fibres for impregnation with a light curing resin which is polyester resin, it is preferred that the bonding layer be an ionomer such as surlyn having a low melt point so that it can be heat bonded to the acrylic fibres. (Surlyn is a trademark for a polyethylene copolymer that is lightly crosslinked via interchain ionic bonds with metallic acrylates.) The barrier layer in such a case may be for example ethylene vinyl alcohol (EVOH) as this provides an excellent barrier against the agressive components of the light curing resin, such as the styrene content, and finally the outer film may be a PVC film or a urethane film such as polyurethane which lends strength to the membrane laminate enabling the material to be shaped using fluid pressure. The outer film also should be capable of being repaired easily for example by patching or sealing using a sealing tape, for example when the material from flat web form is formed into a tube with the membrane outermost, and the adjacent edges of the tube are sewn together to form a seam, it is desirable that a sealing tape can be applied over the seam and heat welded or solvent welded to seal the holes made by the sewing operation, and PVC (polyvinyl chloride) or urethane provide an excellent outer layer for this purpose.

Where the felt layer is to be impregnated with a light curing resin, it is necessary that the membrane laminate should be cable of passing the curing light. Typically, when the polyester light curable resin is used, a light of wave length of 380 to 420 nanometres should be capable of being passed through the membrane in order to effect the resin cure.

It is possible that instead of acrylic fibres, a polypropylene fibre felt is used when the composition of the various layers of the membrane may have to change.

One alternative combination of layers for the membrane comprises a polyethylene layer bonded to the fibres, a nylon layer providing the chemical resistance layer, and a polyurethane layer providing the out layer.

With a membrane such as this provided for example on a flexible lining tube of the nature described above, for the lining of pipelines and passageways, the membrane ensures that the lining can be impregnated with the light curing resin and then stored for a long period, of the order of 5 to 6 months without deleterious effect such as softening and swelling of the membrane by styrene attack as might occur when a simple urethane membrane is used. This is advantageous, because it may be desirable to pre-impregnate liners and store same in opaque bags to keep the light from the resin, until they are ready for use. This simplifies production and delivering.

An example of the invention is illustrated in the accompanying diagrammatic drawing, wherein.

Figure 1:
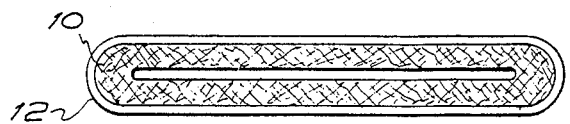
FIG. 1 is a sectional elevation of a flexible lining tube.
Figure 2:
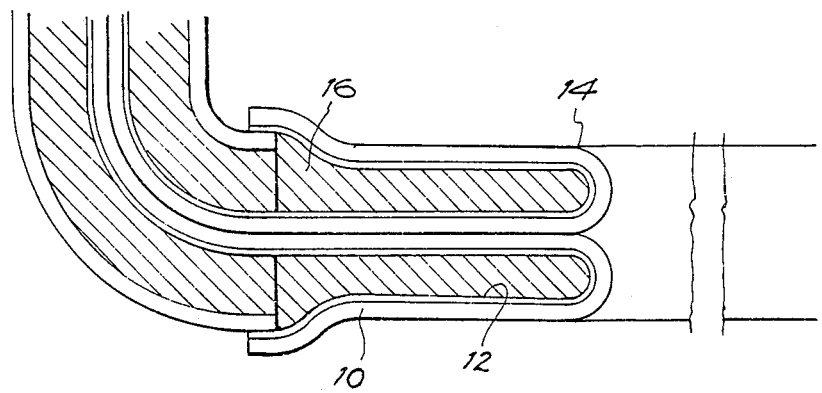
FIG. 2 is a sectional side view showing how the flexible lining tube of FIG. 1 is inserted in a pipeline or passageway to line same.

Referring to FIG. 1 a flexible lining tube comprises an inner layer 10 of fibrous felt material, suitably of acrylic fibres to the outside of which is a transparent membrane 12 which is substantially gas impermeable. To use the liner in lining a pipeline or passageway 14 as shown in FIG. 2, a quantity of resin is charged into the inside of the tube so as thoroughly to impregnate the fibrous felt layer 10. The impregnated lining tube is everted into the pipeline or passageway as shown in FIG. 2 by means of an everting fluid in the space 16 so that the impregnated felt layer is turned outwardly and onto the surface or passageway 14. When the lining tube has been applied throughout the passageway length, it is held in this position until the resin cures when the resin and embedded felt form a rigid lining shell on the passageway surface thereby effecting rehabilitation and repair of the pipeline.

Figure 3:
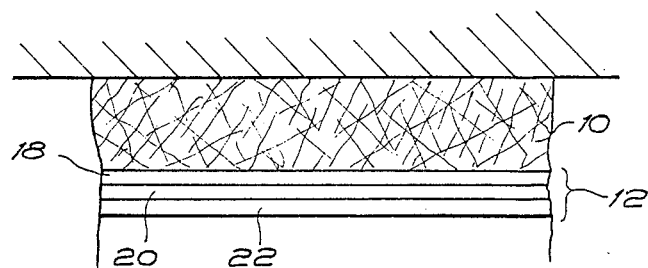
FIG. 3 is an enlarged sectional view showing how the lining tube is constructed.

FIG. 3 shows how the membrane 12 is made up of three layers namely an ionomer layer 18 a barrier layer 20 of EVOH and an outer PVC layer 22 providing the advantageous characteristics as referred to herein.

The ionomer layer 18 is bonded to the fibrous layer 10 and the layers 18, 20 and 22 are bonded to each other.

Figure 4:
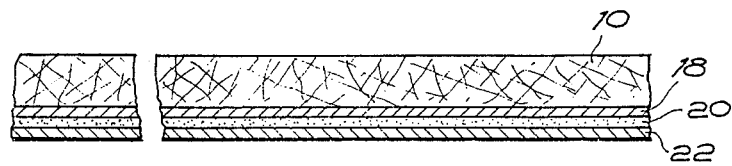
FIG. 4 is a sectional side view of material according to the invention, when in flat form.

FIG. 4 shows a material which is similar to the material of FIG. 1, but is in flat form. Such material can be used for being formed into moulded components such as boat hulls, baths and so on. The material of FIG. 4 is manufactured by coating the bonding layer on the felt in fluent form. The bonding layer coating cures and anchors to the felt. The other layers may be similarly applied or applied as a co-extrudate.

Flat material as shown in FIG. 4 may be coiled to produce the tube of FIG. 1, in which case, the meeting edges are connected together, for example by sewing, and then a sealing tape is applied over the seam and sealed to the outer layer by solvent or heat welding to seal the seam.

I claim:

1. A laminated material comprising
   (a) a fibrous layer,
   (b) a low melting point themoplastic resin layer having one side that is bonded to one side of said fibrous layer,
   (c) a barrier film of high melting point resin having one side thereof bonded to the other side of said low melting point resin layer, said barrier film being capable of serving as a barrier to styrene, and
   (d) an outer film having one side bonded to the other side of said barrier film, this outer film comprising a synthetic resin to which a sealing tape can be sealed by a solvent or by heat welding.

2. A laminated material according to claim 1 wherein said fibrous layer is impregnated with a light curing resin.

3. A laminated material according to claim 1 wherein said low melting point thermoplastic resin layer comprises polyethylene.

4. A laminated material according to claim 2 wherein said low melting point thermoplastic resin layer comprises polyethylene.

5. A laminated material according to claim 1 wherein said barrier film is an ionomer.

6. A laminated material according to claim 1 wherein said barrier film is an ethylene vinyl alcohol resin.

7. A laminated material according to claim 1 wherein said barrier film is nylon.

8. A laminated material according to claim 1 wherein said outer film comprises PVC.

9. A laminated material according to claim 1 wherein said outer film comprises polyurethane.

10. A material according to claim 1 wherein the low melting point thermoplastic resin layer comprises an ionomer, the barrier film comprises nylon or ethylene vinyl alcohol and the outer film comprises PVC.

11. A material according to claim 1 wherein the low melting point thermoplastic resin comprises polypropylene, the barrier film comprises ethylene vinyl alcohol (EVOH), and the outer film comprises polyurethane.

12. A material according to claim 1 wherein said laminated material is in tubular form with the fibrous layer to the inside of the tube, and the adjacent edges of the tube are connected, and at the seam there is a sealing tape sealed to the outer film and bridging the same seam.

13. A laminated material comprising
   (a) a fibrous layer impregnated with a light curing resin,
   (b) a low melting point thermoplastic resin layer having one side that is bonded to one side of said fibrous layer,
   (c) a barrier film of high melting point resin having one side thereof bonded to the other side of said low melting point resin layer, said barrier film serving as a barrier to the movement of the light curing resin, and
   (d) an outer film having one side bonded to the other side of said barrier film, this outer film comprising a synthetic resin to which a sealing tape can be sealed by a solvent or by heat welding.

* * * * *